US009989070B2

(12) United States Patent
Beers et al.

(10) Patent No.: US 9,989,070 B2
(45) Date of Patent: Jun. 5, 2018

(54) AIR CYCLE MACHINE STRUT PLATE ASSEMBLY

(71) Applicant: Hamilton Sundstrand Corporation, Windsor Locks, CT (US)

(72) Inventors: Craig M. Beers, Wethersfield, CT (US); Harold W. Hipsky, Willington, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 725 days.

(21) Appl. No.: 14/503,437

(22) Filed: Oct. 1, 2014

(65) Prior Publication Data
US 2016/0097401 A1 Apr. 7, 2016

(51) Int. Cl.
F04D 29/54 (2006.01)
F04D 19/00 (2006.01)
B64D 13/06 (2006.01)
F04D 27/02 (2006.01)
F04F 5/16 (2006.01)
F25B 9/00 (2006.01)

(52) U.S. Cl.
CPC ............ F04D 29/545 (2013.01); B64D 13/06 (2013.01); F04D 19/00 (2013.01); F04D 19/002 (2013.01); F04D 27/0215 (2013.01); F04D 29/542 (2013.01); F04F 5/16 (2013.01); F25B 9/004 (2013.01)

(58) Field of Classification Search
CPC ...... F04D 29/54; F04D 29/541; F04D 29/542; F04D 29/545; F04D 19/002; F01D 1/12
USPC ................................................ 415/58.4, 58.5
See application file for complete search history.

(56) References Cited

U.S. PATENT DOCUMENTS 5,133,194 A * 7/1992 Army, Jr. ............... B64D 13/00
415/117
2013/0177399 A1 7/2013 McAuliffe et al.

* cited by examiner

Primary Examiner — Richard Edgar
Assistant Examiner — Michael Sehn
(74) Attorney, Agent, or Firm — Cantor Colburn LLP

(57) ABSTRACT

According to one aspect, an air cycle machine includes a fan rotor, a diffuser cone axially aligned with the fan rotor, and a strut plate assembly. The strut plate assembly includes a first strut plate and a second strut plate with an ejector formed between the first strut plate and the second strut plate. The first strut plate is axially positioned between the fan rotor and the ejector, and the second strut plate is axially positioned between the fan rotor and the diffuser cone. The first strut plate includes a plurality of outer struts and is absent inner struts between the fan rotor and the ejector. The second strut plate includes a plurality of inner struts and outer struts, where the inner struts are axially positioned between the ejector and the diffuser cone.

15 Claims, 3 Drawing Sheets

AIR CYCLE MACHINE STRUT PLATE ASSEMBLY

BACKGROUND OF THE INVENTION

The subject matter disclosed herein relates to an air cycle machine and, more particularly, to a strut plate assembly for an air cycle machine.

Conventional aircraft environmental control systems (ECSs) incorporate an air cycle machine, also referred to as an air cycle cooling machine, for use in cooling and dehumidifying air for an aircraft cabin. Such air cycle machines may include two or more wheels disposed at axially spaced intervals along a common shaft. The wheels are part of, for example, a compressor rotor, a turbine rotor, a fan rotor or an additional turbine rotor or an additional compressor rotor. In some cases the turbine or turbines drive both the compressor and the fan.

On aircraft powered by turbine engines, the air to be conditioned in the air cycle machine is typically compressed air bled from one or more of compressor stages of the turbine engine. In conventional systems, this bleed air passes through the air cycle machine compressor where it is further compressed. The compressed air is passed through a heat exchanger to cool the compressed air sufficiently to remove moisture and dehumidify the air. The dehumidified compressed air is expanded in the turbine of the air cycle machine to both extract energy from the compressed air so as to drive the shaft and also to cool the expanded turbine exhaust air before it is supplied to the aircraft cabin as conditioned cooling air.

A flow path of an air cycle machine can also include a heat exchanger cooling flow that draws air through the heat exchanger, past a fan rotor, and dumps the flow into an overboard duct. The fan rotor can be used to establish the flow when insufficient ram air is available to draw air through the heat exchanger. While in service, the heat exchanger can become partially clogged due to dust or other contaminants that reduce available flow volume to the fan rotor, which pushes the fan rotor closer to its surge limit. Designs that attempt to enhance flow as the fan rotor approaches its surge limit may experience a reduction in performance when operating under off-design conditions, which can reduce tolerance to heat exchanger blockage.

BRIEF DESCRIPTION OF THE INVENTION

According to one aspect of the invention, an air cycle machine is provided that includes a fan rotor, a diffuser cone axially aligned with the fan rotor, and a strut plate assembly. The strut plate assembly includes a first strut plate and a second strut plate with an ejector formed between the first strut plate and the second strut plate. The first strut plate is axially positioned between the fan rotor and the ejector, and the second strut plate is axially positioned between the fan rotor and the diffuser cone. The first strut plate includes a plurality of outer struts and is absent inner struts between the fan rotor and the ejector. The second strut plate includes a plurality of inner struts and outer struts, where the inner struts are axially positioned between the ejector and the diffuser cone.

According to another aspect of the invention, a method of installing a strut plate assembly in an air cycle machine is provided. A first strut plate of the strut plate assembly is positioned proximate a fan rotor on a central axis of the air cycle machine, where the first strut plate includes a plurality of outer struts. A second strut plate of the strut plate assembly is positioned proximate a diffuser cone on the central axis of the air cycle machine, where the second strut plate includes a plurality of inner struts and outer struts. A gap is established between the first strut plate and the second strut plate to form an ejector, where the inner struts of the second strut plate are axially positioned between the ejector and the diffuser cone, and the first strut plate is absent inner struts between the fan rotor and the ejector.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of an environmental control system having an air cycle machine include a strut plate assembly with an ejector formed between a pair of strut plates as further described herein. The strut plate assembly can be axially positioned between a fan rotor and a diffuser cone of the air cycle machine. A first strut plate that is between the fan rotor and the ejector has outer struts but no inner struts, thereby reducing ejector blockage and swirl angle effects that can occur if inner struts are positioned between fan rotor and the ejector. A second strut plate includes both inner and outer struts and is axially positioned between the fan rotor and the diffuser assembly. The inner struts of the second strut plate are downstream of the ejector and can be angled and shaped to align with a design point condition of the fan rotor.

Figure 1:
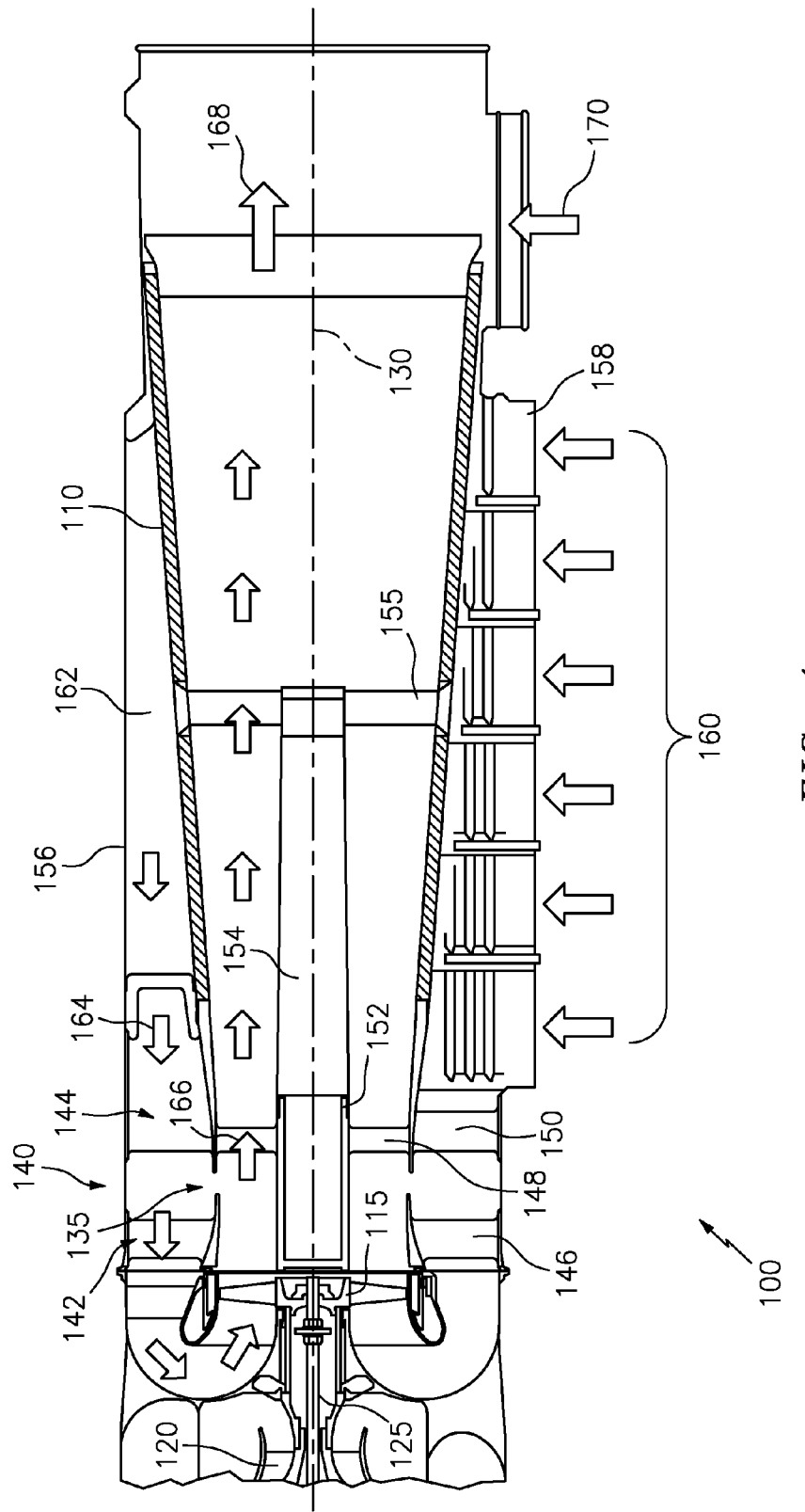
FIG. 1 illustrates a side view, partly in section, of an air cycle machine according to an embodiment of the invention.

Referring to the drawings, FIG. 1 illustrates an example air cycle machine (ACM) 100 according to an embodiment of the invention. Particularly, the ACM 100 includes a fan rotor 115 coupled to a compressor 120 and a turbine (not shown) via a shaft 125, which extends along a central axis 130 of the ACM 100. In an embodiment, the fan rotor 115 and the compressor 120 are powered by the turbine (not shown), which rotatably drives the shaft 125 in response to expansion of compressed air being conditioned as it passes through the ACM 100.

The ACM 100 also includes a diffuser cone 110 that is axially aligned with the fan rotor 115 on the central axis 130. A strut plate assembly 140 is also positioned on the central axis 130. The strut plate assembly 140 includes a first strut plate 142 and a second strut plate 144 with an ejector 135 formed as a gap between the first strut plate 142 and the second strut plate 144. The first strut plate 142 is axially positioned between the fan rotor 115 and the ejector 135 on the central axis 130. The second strut plate 144 is axially positioned between the fan rotor 115 and the diffuser cone 110 on the central axis 130. The first strut plate 142 includes a plurality of outer struts 146 and is absent inner struts between the fan rotor 115 and the ejector 135. The second strut plate 144 includes a plurality of inner struts 148 and outer struts 150. The inner struts 148 are axially positioned between the ejector 135 and the diffuser cone 110 on the central axis 130. The second strut plate 144 also includes a hub 152 that may be coupled to a centerbody 154 of the ACM 100. The centerbody 154 can be supported by the second strut plate 144 and centerbody struts 155 located further downstream in the diffuser cone 110. Both the first strut plate 142 and the second strut plate 144 of the strut plate assembly 140 may be bonded to an outer housing 156 of the ACM 100.

A heat exchanger interface 158 can receive an inlet flow 160 from a heat exchanger (not depicted). A diverter vane 162 can divert a portion or all of the inlet flow 160 along an inlet flow path 164 towards the fan rotor 115. An outlet flow path 166 directs flow past to the fan rotor 115 and towards the diffuser cone 110. An exit flow 168 can route flow from the outlet flow path 166 and/or a heat exchanger bypass flow 170 to dump overboard.

Figure 2:
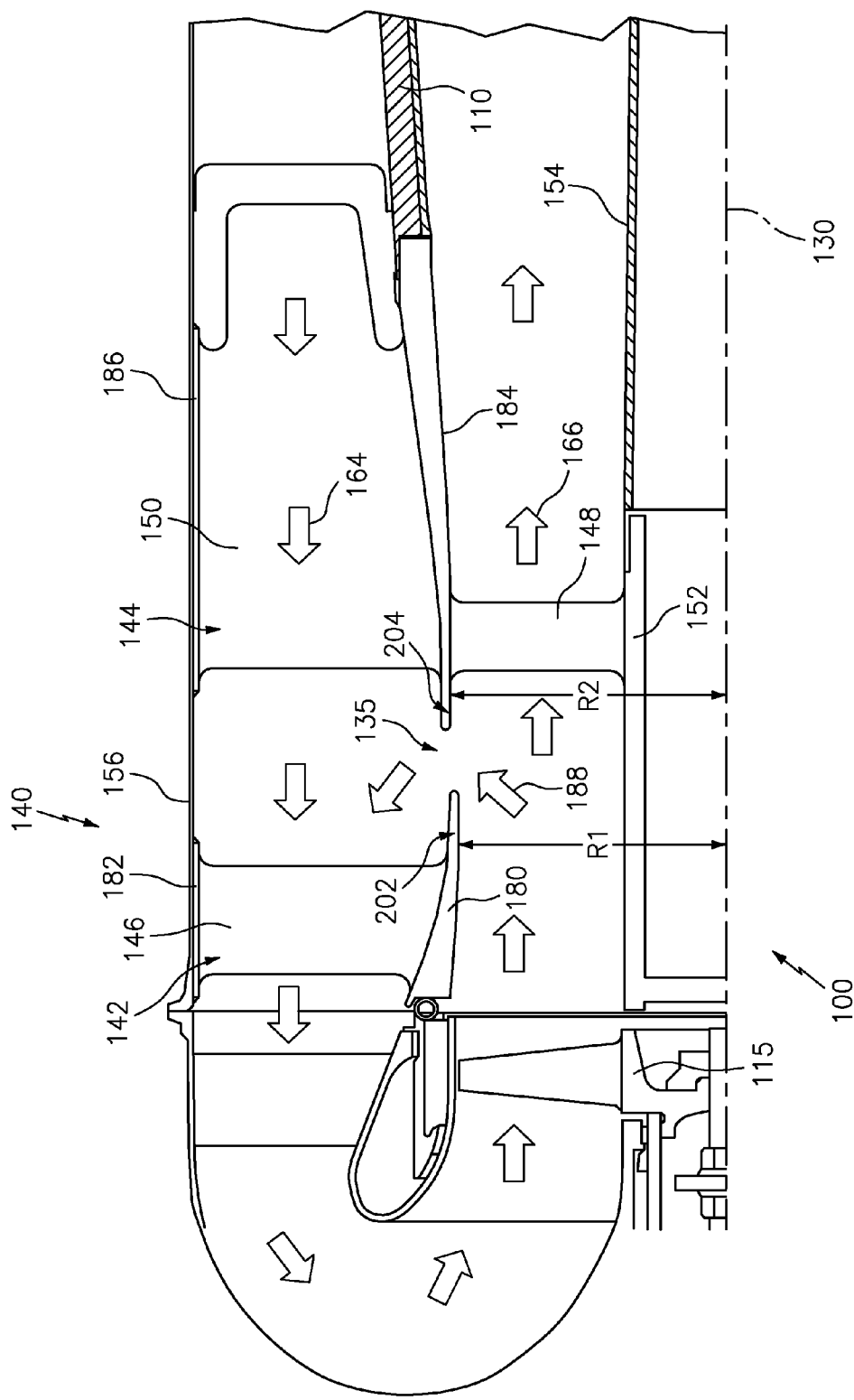
FIG. 2 illustrates an enlarged, perspective sectional view of the air cycle machine shown in FIG. 1 according to an embodiment of the invention.

FIG. 2 illustrates an enlarged, perspective sectional view of the ACM 100 of FIG. 1 according to an embodiment of the invention. As can be seen in FIG. 2, the first strut plate 142 also includes a first intermediate cylindrical portion 180 and a first outer cylindrical portion 182. The outer struts 146 of the first strut plate 142 are formed between the first intermediate cylindrical portion 180 and the first outer cylindrical portion 182. The first outer cylindrical portion 182 may be bonded to the outer housing 156 of the ACM 100. The hub 152 of the second strut plate 144 can extend to coaxially align with the first intermediate cylindrical portion 180 of the first strut plate 142 proximate the fan rotor 115. The second strut plate 144 can also include a second intermediate cylindrical portion 184 and a second outer cylindrical portion 186. The second outer cylindrical portion 186 may be bonded to the outer housing 156 of the ACM 100. The outer struts 150 of the second strut plate 144 are formed between the second intermediate cylindrical portion 184 and the second outer cylindrical portion 186. The inner struts 148 are formed between the second intermediate cylindrical portion 184 and the hub 152.

The first intermediate cylindrical portion 180 of the first strut plate 142 may form a nozzle portion 202, and the second intermediate cylindrical portion 184 of the second strut plate 144 may form a diffuser portion 204. The nozzle portion 202 may have a radius R1 relative to the central axis 130, and the diffuser portion 204 may have a radius R2 relative to the central axis 130, where the radius R2 of the diffuser portion 204 is greater than the radius R1 of the nozzle portion 202.

The inlet flow path 164 from a heat exchanger (not depicted) is defined between the second intermediate cylindrical portion 184 and the second outer cylindrical portion 186 of the second strut plate 144. The outlet flow path 166 to the diffuser cone 110 is defined between the second intermediate cylindrical portion 184 and the hub 152 of the second strut plate 144. The ejector 135 defines a recirculation flow path 188. The recirculation flow path 188 provides flow to the fan rotor 115 in the event that the inlet flow 160 is reduced, for instance, due to clogging of the heat exchanger (not depicted). By keeping a volume of space between the fan rotor 115 and the ejector 135 free from structural elements, such as one or more inner struts, potential blockage or performance degradation of the ejector 135 is reduced. In contrast, if an inner strut is placed between the fan rotor 115 and the ejector 135, strut orientation, strut length, and strut thickness can all impact potential flow through the recirculation flow path 188. Thus, by limiting the position of inner struts to the second strut plate 144 as inner struts 148, potential adverse impact on the ejector 135 is reduced. The inner struts 148 of the second strut plate 144 may be airfoils angled to align with a flow produced at a design point condition of the fan rotor 115, such as a maximum rotation velocity of the fan rotor 115. Keeping the volume of space between the fan rotor 115 and the ejector 135 free from structural elements can enable designing of the inner struts 148 to more closely align with design features of the fan rotor 115 rather than a tradeoff between performance of the ejector 135 versus performance of the fan rotor 115.

Figure 3:
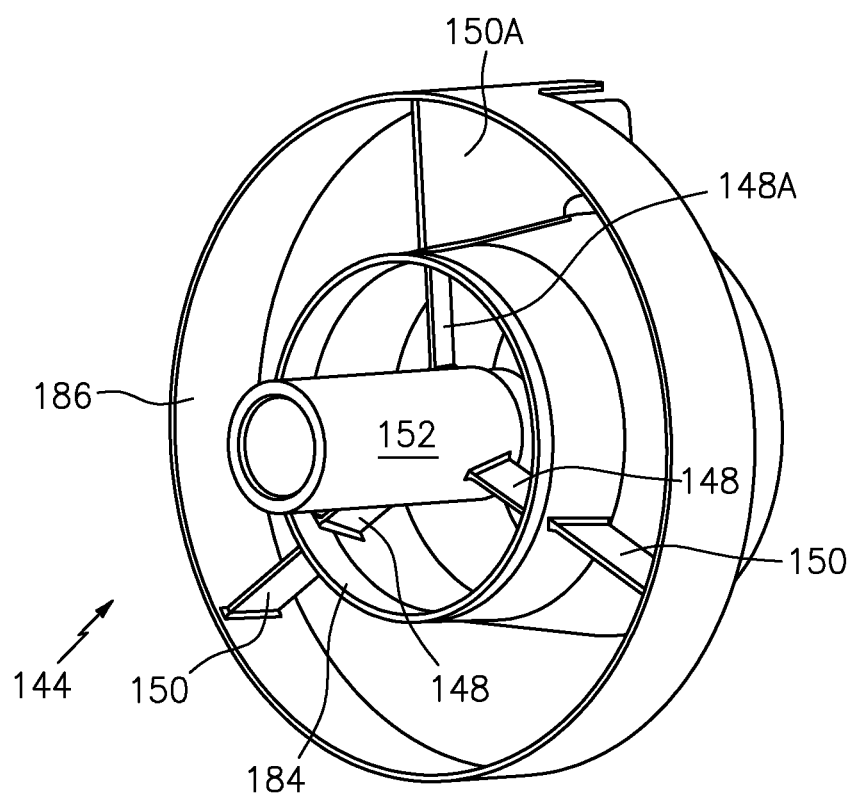
FIG. 3 illustrates a perspective view of a strut plate of the air cycle machine shown in FIGS. 1 and 2 according to an embodiment of the invention.

FIG. 3 illustrates a perspective view of the second strut plate 144 of the ACM 100 shown in FIGS. 1 and 2 according to an embodiment of the invention. In the example of FIG. 3, it can be seen that there may be a different number of inner struts 148 between the hub 152 and the second intermediate cylindrical portion 184 than outer struts 150 between the second intermediate cylindrical portion 184 and the second outer cylindrical portion 186. Some of the inner struts 148 and/or the outer struts 150 may vary in design based on a particular design goal. For example, inner strut 148A and outer strut 150A may be radially aligned, while other struts may not be radially aligned. In an embodiment where the hub 152 houses a speed sensor (not depicted) for the fan rotor 115 of FIGS. 1 and 2, the inner strut 148A and the outer strut 150A may be used to route speed sensor wires (not depicted) due to their respective radial alignment.

In reference to FIGS. 1-3, a method of installing the strut plate assembly 140 in the ACM 100 may include positioning the first strut plate 142 of the strut plate assembly 140 proximate the fan rotor 115 on the central axis 130 of the ACM 100, where the first strut plate 142 includes a plurality of outer struts 146. The second strut plate 144 of the strut plate assembly 140 can be positioned proximate the diffuser cone 110 on the central axis 130 of the ACM 100, where the second strut plate 144 includes a plurality of inner struts 148 and outer struts 150. A gap is established between the first strut plate 142 and the second strut plate 144 to form the ejector 135, where the inner struts 148 of the second strut plate 144 are axially positioned between the ejector 135 and the diffuser cone 110, and the first strut plate 142 is absent inner struts between the fan rotor 115 and the ejector 135. The first strut plate 142 and the second strut plate 144 can both be bonded to the outer housing 156. The fan rotor 115 can be coupled to the shaft 125 driven by the turbine (not shown) of the ACM 100. The second strut plate 144 can be coupled to the diffuser cone 110 and the centerbody 154.

The technical effects and benefits of exemplary embodiments include an air cycle machine having an ejector formed between two strut plates of a strut plate assembly. The absence of inner struts in a flow path between a fan rotor and the ejector can result in reduced ejector blockage and improved alignment of inner struts located downstream from the fan rotor with a design point condition of the fan rotor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An air cycle machine, comprising:
   a fan rotor;
   a diffuser cone axially aligned with the fan rotor; and
   a strut plate assembly comprising a first strut plate and a second strut plate with an ejector formed as a gap axially between a nozzle portion of the first strut plate and a diffuser portion of the second strut plate, the diffuser portion having a greater radius than the nozzle portion and radially non-overlapping the nozzle portion, the first strut plate axially positioned between the fan rotor and the ejector and the second strut plate axially positioned between the ejector and the diffuser cone, wherein the first strut plate comprises a plurality of outer struts and is absent inner struts between the fan rotor and the ejector, and the second strut plate comprises a plurality of inner struts and outer struts, the inner struts axially positioned between the ejector and the diffuser cone, and the ejector defines a recirculation flow path to recirculate a flow generated by the fan rotor back to the fan rotor.

2. The air cycle machine according to claim 1, wherein the first strut plate further comprises a first intermediate cylindrical portion and a first outer cylindrical portion, where the outer struts of the first strut plate are formed between the first intermediate cylindrical portion and the first outer cylindrical portion.

3. The air cycle machine according to claim 2, wherein the second strut plate further comprises a hub that extends to coaxially align with the first intermediate cylindrical portion of the first strut plate.

4. The air cycle machine according to claim 3, wherein the second strut plate further comprises a second intermediate cylindrical portion and a second outer cylindrical portion, where the outer struts of the second strut plate are formed between the second intermediate cylindrical portion and the second outer cylindrical portion, and the inner struts are formed between the second intermediate cylindrical portion and the hub.

5. The air cycle machine according to claim 4, wherein the first intermediate cylindrical portion forms the nozzle portion and the second intermediate cylindrical portion forms the diffuser portion.

6. The air cycle machine according to claim 4, wherein an inlet flow path from a heat exchanger is defined between the second intermediate cylindrical portion and the second outer cylindrical portion, an outlet flow path to the diffuser cone is defined between the second intermediate cylindrical portion and the hub, and the ejector recirculates the flow to the recirculation flow path responsive to a flow reduction from the inlet flow path.

7. The air cycle machine according to claim 1, wherein the inner struts of the second strut plate are airfoils angled to align with a flow produced at a design point condition of the fan rotor.

8. The air cycle machine according to claim 7, wherein the design point condition is a maximum rotation velocity of the fan rotor.

9. A method of installing a strut plate assembly in an air cycle machine, the method comprising:
   positioning a first strut plate of the strut plate assembly proximate a fan rotor on a central axis of the air cycle machine, the first strut plate comprising a plurality of outer struts;
   positioning a second strut plate of the strut plate assembly proximate a diffuser cone on the central axis of the air cycle machine, the second strut plate comprising a plurality of inner struts and outer struts; and
   establishing a gap axially between a nozzle portion of the first strut plate and a diffuser portion of the second strut plate to form an ejector, the diffuser portion having a greater radius than the nozzle portion and radially non-overlapping the nozzle portion, wherein the inner struts of the second strut plate are axially positioned between the ejector and the diffuser cone, the first strut plate is absent inner struts between the fan rotor and the ejector, and the ejector defines a recirculation flow path to recirculate a flow generated by the fan rotor back to the fan rotor.

10. The method according to claim 9, wherein the first strut plate further comprises a first intermediate cylindrical portion and a first outer cylindrical portion, where the outer struts of the first strut plate are formed between the first intermediate cylindrical portion and the first outer cylindrical portion.

11. The method according to claim 10, wherein the second strut plate further comprises a hub that extends to coaxially align with the first intermediate cylindrical portion of the first strut plate.

12. The method according to claim 11, wherein the second strut plate further comprises a second intermediate cylindrical portion and a second outer cylindrical portion, where the outer struts of the second strut plate are formed between the second intermediate cylindrical portion and the second outer cylindrical portion, and the inner struts are formed between the second intermediate cylindrical portion and the hub.

13. The method according to claim 12, wherein the first intermediate cylindrical portion forms the nozzle portion and the second intermediate cylindrical portion forms the diffuser portion.

14. The method according to claim 12, wherein an inlet flow path from a heat exchanger is defined between the second intermediate cylindrical portion and the second outer cylindrical portion, an outlet flow path to the diffuser cone is defined between the second intermediate cylindrical portion and the hub, and the ejector recirculates the flow to the recirculation flow path responsive to a flow reduction from the inlet flow path.

15. The method according to claim 9, wherein the inner struts of the second strut plate are airfoils angled to align with a flow produced at a maximum rotation velocity of the fan rotor.

* * * * *